United States Patent
Rakshit

(10) Patent No.: US 10,178,150 B2
(45) Date of Patent: Jan. 8, 2019

(54) EYE CONTACT-BASED INFORMATION TRANSFER

(71) Applicant: International Business Machines Corporation, Armonk, NY (US)

(72) Inventor: Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 442 days.

(21) Appl. No.: 14/821,161

(22) Filed: Aug. 7, 2015

(65) Prior Publication Data
US 2017/0041374 A1   Feb. 9, 2017

(51) Int. Cl.
*H04L 29/08* (2006.01)
*G06F 3/01* (2006.01)
(Continued)

(52) U.S. Cl.
CPC ............ *H04L 67/06* (2013.01); *G02B 27/017* (2013.01); *G06F 1/163* (2013.01); *G06F 1/1698* (2013.01); *G06F 3/011* (2013.01); *G06F 3/013* (2013.01); *G06F 3/0304* (2013.01); *G06F 9/543* (2013.01); *H04L 67/141* (2013.01); *H04L 67/18* (2013.01); *G02B 2027/014* (2013.01); *G02B 2027/0138* (2013.01); *G02B 2027/0187* (2013.01)

(58) Field of Classification Search
CPC ............ H04L 29/08; G02B 27/01; G06F 3/01
See application file for complete search history.

(56) References Cited

U.S. PATENT DOCUMENTS

| 444,795 A | 1/1891 | King |
| 5,619,378 A | 4/1997 | Schwab |

(Continued)

FOREIGN PATENT DOCUMENTS

| JP | 2000353248 A | 12/2000 |
| JP | 2002368762 A | 12/2002 |

(Continued)

OTHER PUBLICATIONS

Appendix P citing related patent application U.S. Appl. No. 14/283,990.
(Continued)

*Primary Examiner* — Ario Etienne
*Assistant Examiner* — Kidest Mendaye
(74) *Attorney, Agent, or Firm* — Law Offices of Ira D. Blecker, P.C.

(57) ABSTRACT

A method, computer program product and system for eye contact-based information transfer. Communication is established by a computer device between a first head mounted device worn by a first user and a second head mounted device worn by a second user. Gaze tracking establishes through gaze tracking of the first head mounted device and the second head mounted device that the first head mounted device and the second head mounted device have made eye contact. Responsive to an input to at least one of the first head mounted device and the second head mounted device made while the first head mounted device and the second head mounted device have established eye contact, a computer device transfers a file between the first head mounted device and the second head mounted device.

8 Claims, 5 Drawing Sheets

(51) Int. Cl.
  *G06F 1/16* (2006.01)
  *G06F 3/03* (2006.01)
  *G06F 9/54* (2006.01)
  *G02B 27/01* (2006.01)

(56) References Cited

U.S. PATENT DOCUMENTS

| | | | |
|---|---|---|---|
| 5,689,619 | A | 11/1997 | Smyth |
| 7,401,920 | B1 | 7/2008 | Kranz et al. |
| 7,522,344 | B1 | 4/2009 | Curatu et al. |
| 7,542,210 | B2 | 6/2009 | Chirieleison, Sr. |
| 8,096,660 | B2 | 1/2012 | Vertegaal et al. |
| 8,472,120 | B2 | 6/2013 | Border et al. |
| 8,482,859 | B2 | 7/2013 | Border et al. |
| 8,488,246 | B2 | 7/2013 | Border et al. |
| 8,510,166 | B2 | 8/2013 | Neven |
| 8,836,771 | B2 * | 9/2014 | Strong ............... G01C 21/165 348/53 |
| 2011/0228975 | A1 | 9/2011 | Hennessey et al. |
| 2012/0212484 | A1 | 8/2012 | Haddick et al. |
| 2012/0235900 | A1 | 9/2012 | Border et al. |
| 2012/0274750 | A1 | 11/2012 | Strong |
| 2013/0293468 | A1 | 11/2013 | Perez et al. |
| 2015/0002394 | A1 | 1/2015 | Cho et al. |
| 2015/0102981 | A1 * | 4/2015 | Lee ..................... G06F 3/013 345/8 |
| 2016/0034029 | A1 * | 2/2016 | Lyons .................. G06F 3/013 715/748 |

FOREIGN PATENT DOCUMENTS

| | | | |
|---|---|---|---|
| JP | 3413127 | B2 | 6/2003 |
| JP | 2013020422 | A | 1/2013 |

OTHER PUBLICATIONS

Zhefan Ye et al., "Detecting Eye Contact using Wearable Eye-Tracking Glasses", UbiComp '12, Sep. 5-8, 2012, Pittsburgh, PA, all pages.

"Sharing your Pictures and Videos", [online], [retrieved from the internet on Feb. 24, 2015], <URL: https://support.google.com/glass/answer/3079691?hl=en>, all pages.

Jamie Carter, "You can control Haier's Eye TV using just your eyes", [online], [retrieved from the internet on Feb. 24, 2015], <URL: http://www.techradar.com/news/television/you-can-control-haier-s-eye-tv-using-just-your-eyes-1094526>, all pages.

John M. Franchak et al., "Head-mounted eye-tracking of infants' natural interactions: a new method", Proceedings of the 2010 Symposium on Eye-Tracking Research & Applications, pp. 21-27, 2010, all pages.

Hong Hua et al., "Video-Based Eyetracking Methods and Algorithms in Head-Mounted Displays", Optics Express, vol. 14, Issue 10, 2006, pp. 4328-4350, all pages.

Sri Satchmo, "Arjuna bird's eye". [online]. Nov. 26, 2011. [retrieved on Jan. 24, 2014]. Retrieved from the Internet. <URL: http://srisatchmo.wordpress.com/tag/arjuna-birds-eye/>, all pages.

Hyun Soo Park et al., "3D Social Saliency from Head-mounted camera", Advances in Neural Information Processing Systems (NIPS), Dec. 2012, 25, pp. 431-439.

"Google Glass: release date, news and features". [online], Nov. 7, 2013. [retrieved on Jan. 24, 2014]. Retrieved from the Internet <URL: http://www.techradar.com/news/video/google-glass-what-you-need-to-know-1078114>, all pages.

"Mutualink Unveils Google Glass for Public Safety". [online]. Aug. 19, 2013. [retrieved on Jan. 24, 2014]. Retrieved from the Internet <URL: http://www.businesswire.com/news/home/20130819005155/en/Mutualink-Unveils-Google-Glass-Public-Safety>, all pages.

"What are the advantages of having two eyes'?". [online]. [retrieved on Feb. 3, 2014]. Retrieved from the Internet <URL: http://wiki.answers.com/Q/What_are_the_advantages_of_having_two_eyes>, all pages.

"Calculate distance, bearing and more between Latitude/Longitude points". [online] [retrieved on May 15, 2014]. Retrieved from the Internet <URL: http://www.movable-type.co.uk/scripts/latlong.html>, all pages.

"EasyMeasure—Measure with your Camera". [online] [retrieved on May 15, 2014]. Retrieved from the Internet <URL: https://itunes.apple.com/us/app/easymeasure-measure-your-camera!/id349530105?mt=8>, all pages.

"Smart Measure". [online] [retrieved on May 15, 2014]. Retrieved from the Internet <URL:https://play.google.com/store/apps/details?id=kr.sira.measure>, all pages.

* cited by examiner

EYE CONTACT-BASED INFORMATION TRANSFER

RELATED APPLICATION

This application is related to U.S. patent application Ser. No. 14/283,990, filed May 21, 2014, entitled "SHARING OF TARGET OBJECTS", the disclosure of which is incorporated by reference herein.

BACKGROUND

The present invention relates to the transfer of information between users and, more particularly, relates to a first user sharing information with a second user which may include transferring information when the first and second users make eye contact as facilitated by head mounted computer devices worn by the first and second users.

Head mounted devices for viewing objects are well known. One such head mounted device is Google Glass in which a pair of glasses has a video display and computer device in the frame of the glasses. The head mounted device may be used for a number of functions including taking pictures, sending images, and communicating with others by Wi-Fi or cellular technology.

BRIEF SUMMARY

The various advantages and purposes of the exemplary embodiments as described above and hereafter are achieved by providing, according to a first aspect of the exemplary embodiments, a method for eye contact-based information transfer which includes: establishing communication by a computer device between a first head mounted device worn by a first user and a second head mounted device worn by a second user; establishing through gaze tracking of the first head mounted device and the second head mounted device that the first head mounted device and the second head mounted device have made eye contact; and responsive to an input to at least one of the first head mounted device and the second head mounted device made while the first head mounted device and the second head mounted device have established eye contact, transferring by a computer device a file between the first head mounted device and the second head mounted device.

According to a second aspect of the exemplary embodiments, there is provided a computer program product for eye contact-based information transfer, the computer program product including: a computer readable storage medium having stored thereon: first program instructions executable by a first computer device in a first head mounted device and a second computer device in a second head mounted device to cause the first and second computer devices to establish communication between the first head mounted device worn by a first user and the second head mounted device worn by a second user; second program instructions executable by the first and second computer devices to establish through gaze tracking of the first head mounted device and the second head mounted device that the first head mounted device and the second head mounted device have made eye contact; and responsive to an input to at least one of the first head mounted device and the second head mounted device made while the first head mounted device and the second head mounted device have established eye contact, third program instructions executable by the first and second computer devices to transfer a file between the first head mounted device and the second head mounted device.

According to a third aspect of the exemplary embodiments, there is provided a system for eye contact-based information transfer including: a head mounted device having a video display and a computer device; the computer device having a computer readable storage medium having stored on: first program instructions executable by a first computer device in a first head mounted device and a second computer device in a second head mounted device to cause the first and second computer devices to establish communication between the first head mounted device worn by a first user and the second head mounted device worn by a second user; second program instructions executable by the first and second computer devices to establish through gaze tracking of the first head mounted device and the second head mounted device that the first head mounted device and the second head mounted device have made eye contact; and responsive to an input to at least one of the first head mounted device and the second head mounted device made while the first head mounted device and the second head mounted device have established eye contact, third program instructions executable by the first and second computer devices to transfer a file between the first head mounted device and the second head mounted device.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
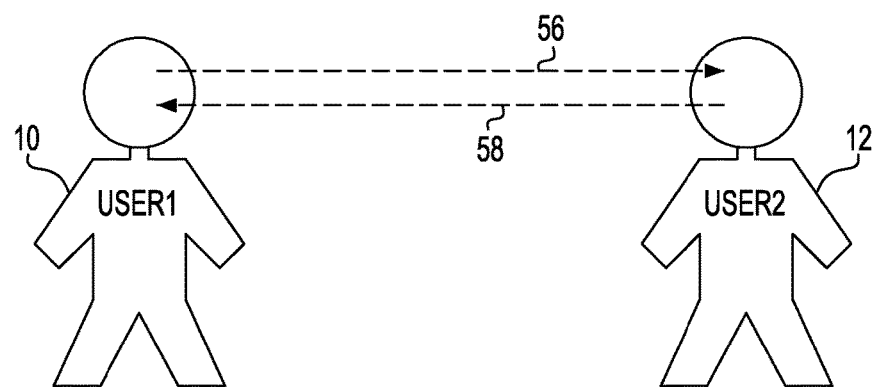
FIG. 1 is an illustration of two users who are in proximity to one another.

Referring to the Figures in more detail, and particularly referring to FIG. 1, there is illustrated a pair of users, user1 10 and user2 12, who are in proximity to one another. By "proximity", it is meant that the pair of users are sufficiently close together that eye contact can be made and seen. Proximity may include standing next to one another as well as being several tens of yards apart. Proximity may also include being remotely separated but visually connected such as by video conferencing. It would be desirable to have a way for user1 10 to share with user2 12 (and vice-versa) a file that user1 10 may have in his/her possession.

The present inventor proposes exemplary embodiments in which user1 10 and user2 12 may each wear a head mounted device that may determine when eye contact between user1 10 and user2 12 is made. The head mounted device may be any head mounted device such as Google Glass, Looxcie, iOptik or Goldeni, just to name a few.

Figure 2:
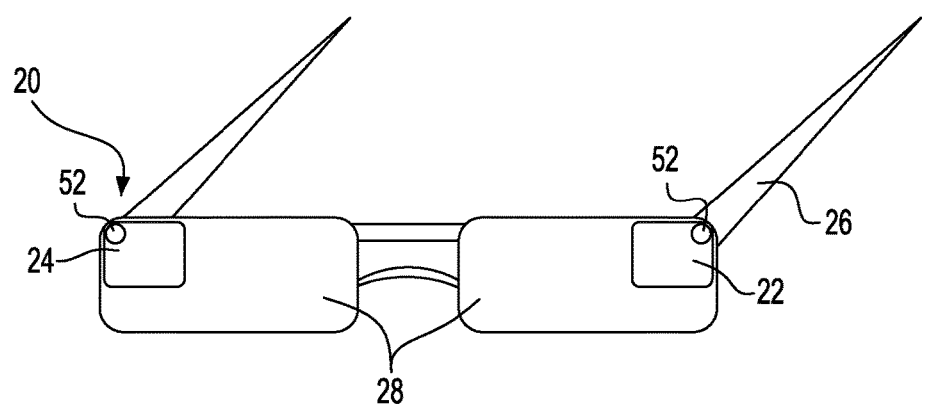
FIG. 2 is an illustration of a head mounted device that may be used in the exemplary embodiments.

Referring now to FIG. 2, there is shown an illustration of a head mounted device 20 that may be used in the exemplary embodiments. It should be understood that head mounted device 20 shown in FIG. 2 is only meant for purposes of illustration and not limitation and that other head mounted devices may serve the purposes of the exemplary embodiments provided these other head mounted devices have the functions and capabilities described herein.

Head mounted device 20 may include a video display 22 for the left eye and a video display 24 for the right eye. Head mounted device 20 may further include one or more cameras 52. Included within the frame 26 of the head mounted device 20 may be one or more computer devices (not shown in FIG. 2). Head mounted device 20 may or may not have lenses 28 which may or may not be prescription lenses.

Figure 3:
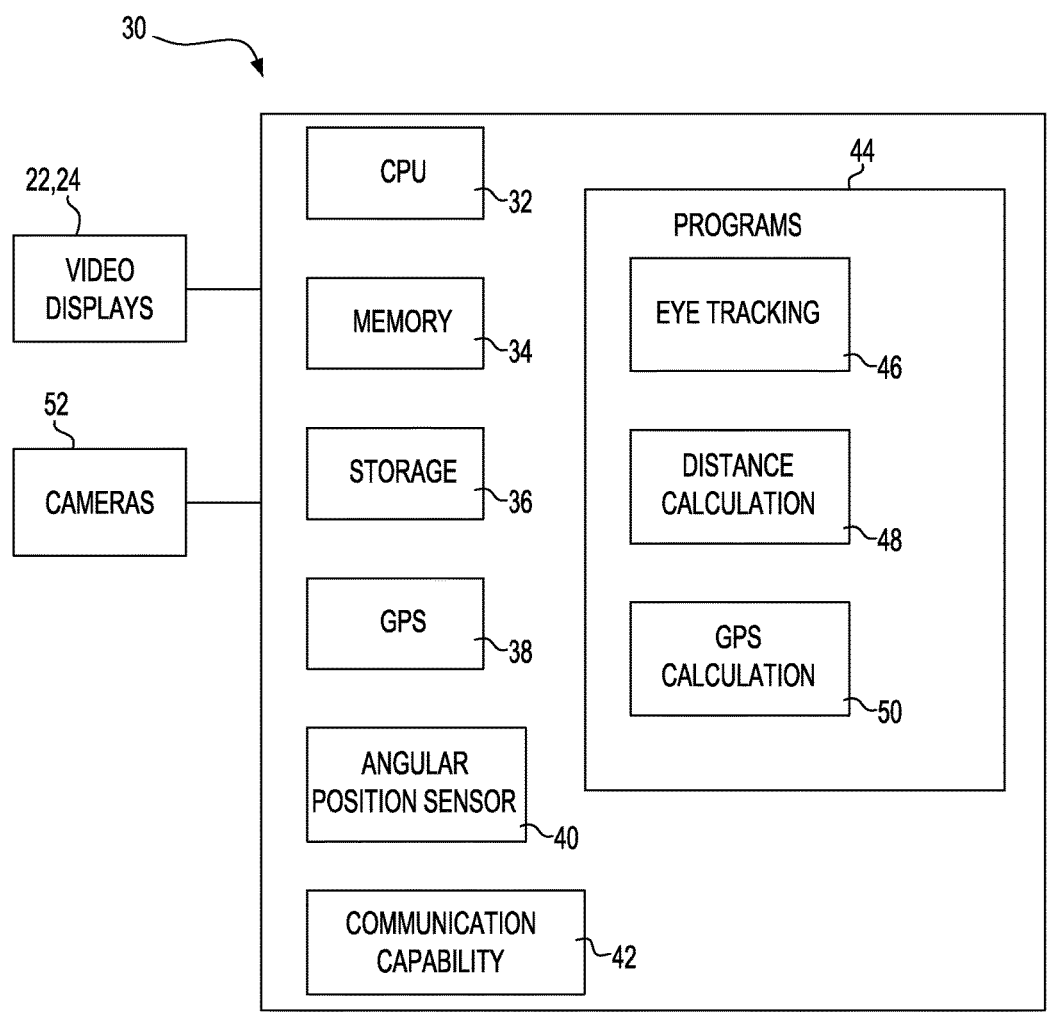
FIG. 3 is a block diagram of a computer device that may be present in the head mounted device of FIG. 2.

Referring now to FIG. 3, there is shown a block diagram of a computer device 30 that may be present in head mounted device 20. Computer device 30 may include a central processing unit (CPU) 32, memory 34 and storage 36, such as solid state storage. While storage 36 is shown as within computer device 30, storage 36 may alternatively be cloud storage (i.e., storage on a remote server which may be connected to the head mounted device 20 by a network such as the internet via cellular or Wi-Fi capability in the head mounted device 20.). In addition, the computer device 30 may have a Global Positioning System (GPS) 38 and an angular position sensor 40, such as a digital compass, for determining the angular position of the head mounted device 20. It is preferred that the head mounted device 20 have communication capability, indicated by box 42, to communicate with other head mounted devices. The communication capability may include Wi-Fi, Bluetooth, near field communication (NFC), cellular and even satellite capability.

The computer device 30 may, in addition, have certain applications or programs 44 resident in the computer device 30. These applications or programs 44 may include eye tracking 46 of the user of the head mounted device 20, distance calculation 48 to a target object and GPS calculation 50 to calculate, for example, the distance and bearing between two GPS locations or determining the GPS location of the target object. It should be understood that it is within the scope of the exemplary embodiments for these applications or programs 44 to be accessible remotely by the internet or in cloud storage.

The computer device 30 may be connected to video screens 22, 24 shown in FIG. 2. In addition, the computer device 30 may be connected to one or more cameras 52 that may be present in the head mounted device 20. The cameras 52 may be facing toward user1 10 to catch eye movements of user1 10 (described hereafter) or facing away from user1 10 or both.

Referring back to FIG. 1, in one exemplary embodiment, a user1 10 may focus towards user2 12. The focus 56 of user 110 may be obtained by eye tracking of user1 10, in conjunction with the compass bearing of user1's head. The angular position of the head of user1 10 with respect to user2 12 may be registered by the angular position sensor 40 in computer device 30. In addition, the gaze of user1 10 toward user2 12 may be obtained through eye tracking of the user1 10.

In order to determine the focus of user1 10 towards user2 12, it may be necessary to obtain both the angular position of the head of user1 10 to user2 12 as well as the gaze of user1 10 to user2 12. That is, both the direction of looking (i.e., angular position of the head of the user) as well as the person looked at (i.e., gaze of user) may be necessary.

Figure 4:
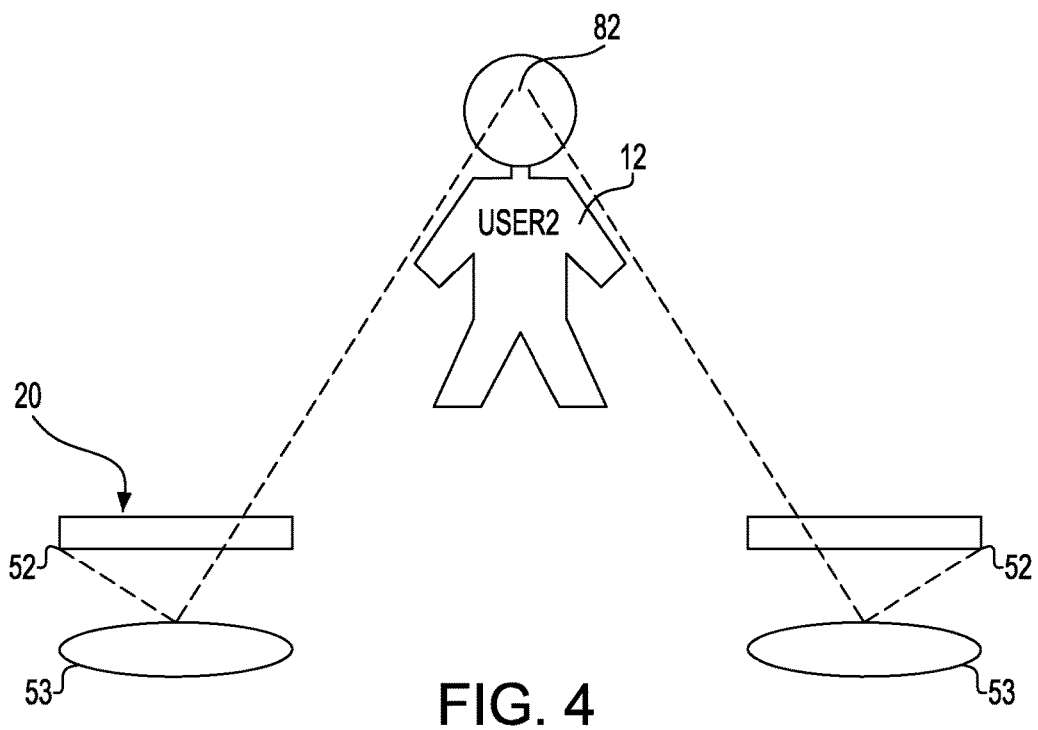
FIG. 4 is an illustration of one method of eye tracking that may be used in the exemplary embodiments.

Eye tracking is a well known technique for determining the point at which a user may be focusing on. One method of eye tracking is illustrated in FIG. 4 where cameras 52 in the head mounted device 20 may register eye movements 53 of the user1 10 as the user1 10 focuses on user2 12. The focus of user1 10 on user2 12 is indicated at 82. These eye movements 53 may be converted to a user's gaze by eye tracking application 46 in computer device 30.

Figure 7A:
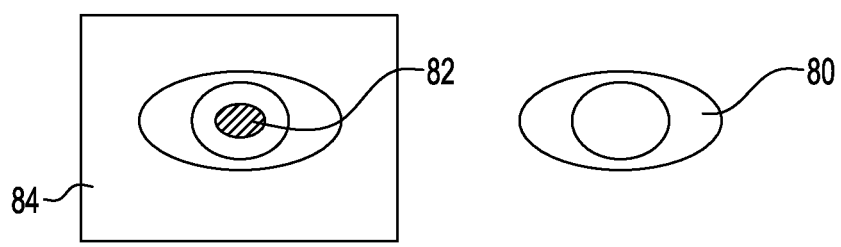
FIGS. 7A and 7B illustrate the focus and field of view of a user focusing on another user.
Figure 7B:
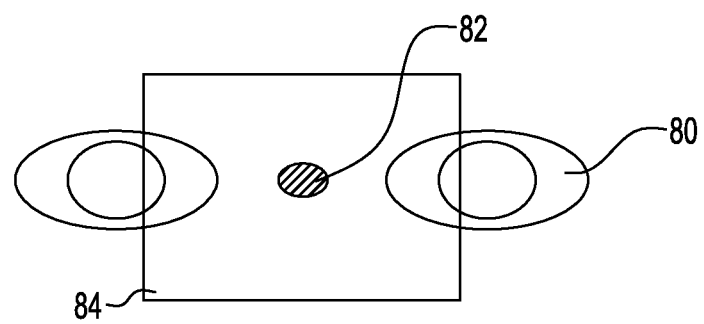

Referring now to FIGS. 7A and 7B, there is a fuller illustration of the focus 82 of user1 10 on user2 12. As shown in FIG. 7A, user1 10 is focusing directly on user2's eye 80. However, it is not necessary that user1 10 and user2 12 make eye contact such that user1's eye (not shown), as determined by eye tracking, is focusing directly on user2's eye 80 as shown in FIG. 7A. This is because the focus of user1 10 as indicated by 82 is actually smaller than user1's field of view 84. The farther that user1 10 is away from user2 12, the larger will be user1's field of view 84. As long as user2's eye 80 is within user1's field of view 84, then user1 10 will be considered to have made eye contact with user2 12. This is illustrated in FIG. 7B, where the focus 82 of user1 10 is between the eyes 80 of user2 12 but user1's field of view 84 overlaps with at least one eye 80 of user2 12.

In a similar manner, the focus of user2 12 towards user1 10 may be determined by user2's head mounted device 20.

However, before user1 10 and user2 12 can independently determine if they are focusing on each other, there must be some communication established between user1 10 and user2 12. User1 10 and user2 12 may have a pre-established relationship, such as working for the same company or being friends, in which case their respective head mounted devices 20 may have been configured to communicate through communication capability 42 with each other when they are sensed to be in proximity. Thus, when user1 10 and user2 12 are located in the same proximity, user1's head mounted device 20 may sense user2's head mounted device 20 and similarly user2's head mounted device 20 may sense user1's head mounted device 20. Once the respective user's head mounted devices 20 are each sensed, communication through communication capability 42 may be established.

Communication/sensing may be established by several different means. If user1 10 and user2 12 are close by, communication may be established by NFC or Bluetooth. As presently known, Bluetooth devices must be paired before communication can begin so the use of Bluetooth would require an extra step of pairing before communication may begin. However, once paired, the respective head mounted devices 20 may be automatically capable of sensing the presence of the other head mounted device 20 followed by communication once they are in Bluetooth range. User1 10 and user2 may also sense and communicate through WiFi, either directly or through the internet.

After communication between user1 10 and user2 12 has been established, user1 10 may focus on user2 12 and attempt to catch the eye of user2 12. If user1 10 and user2 12 are focused on each other as determined by their respective head mounted devices 20, user1 10 may transmit a file to user2 12. That is, user1's head mounted device 20 indicates to user1 10 that user1 10 is focusing on user2 12. Similarly, user2's head mounted device 20 indicates to user2 12 that user2 12 is focusing on user1 10.

In one exemplary embodiment, after eye contact has been made between user1 10 and user2 12, user1 10 may transmit a file to user2 12. In another exemplary embodiment, prior to the transmitting of the file, user1 10 may indicate to user2 12 that user1 10 has a file that user1 10 wishes to transfer to user2 12. User1 10 may indicate this transfer by a text message, which may occur through the head mounted devices 20 or by user1 10 using his cell phone to transmit a text message to user2 12, which user2 12 may receive by user2's head mounted device 20 or by user2's cell phone. User1 10 may through an input menu in user1's head mounted device 20 or by a head gesture understood by user1's head mounted device 20 cause the head mounted device 20 to transmit the file to user2's head mounted device 20.

The file that user1 10 transmits may be any digital file such as a document, picture, video, song, etc. The actual means of transmission of the file may be by any means of transmission including but not limited to WiFi, text, Bluetooth, cellular, internet, etc.

In one exemplary embodiment, the file is transferred only while user1 10 and user2 are focused on one another. In another exemplary embodiment, user1 10 and user2 12 may only be focused on one another when file transfer begins and then after file transfer begins, user1 10 and user2 12 may focus elsewhere.

Figure 5:
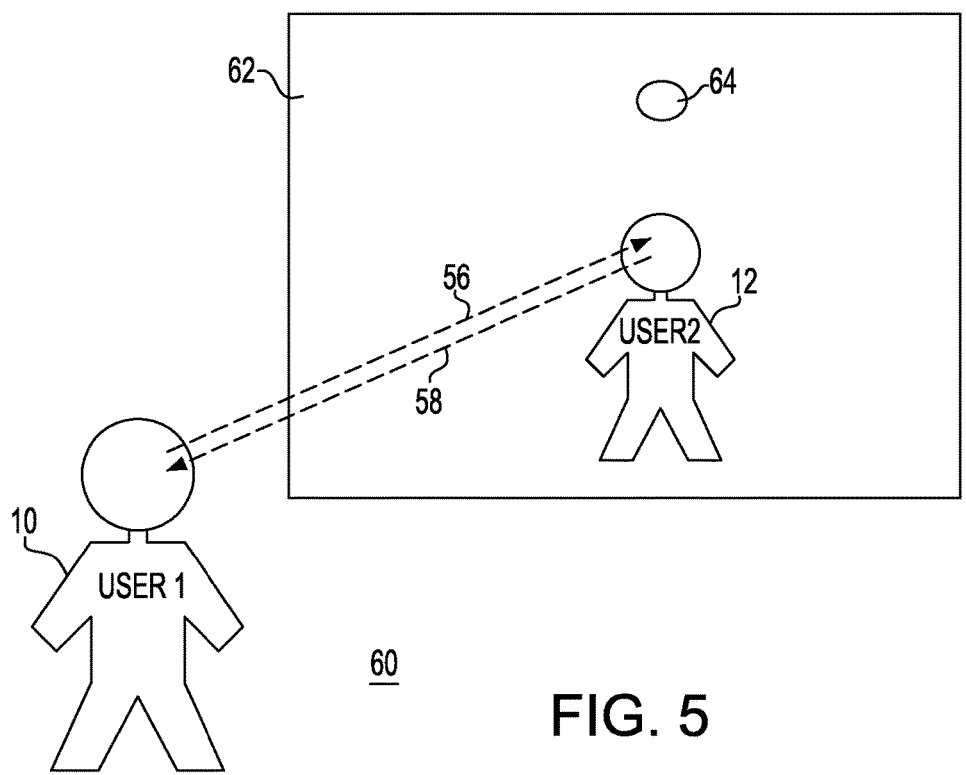
FIG. 5 is an illustration of eye contact between two users who are remotely located from each other but visually connected through a monitor.

In a further exemplary embodiment, user1 10 and user2 12 may be in different locations but still visually connected which will still allow the transfer of files through eye contact. Referring now to FIG. 5, user1 10 may be located in a location 60 in which user2 12 is not located. However, user2 12 is visually connected to user1 10 through monitor 62. In a similar manner, user2 12 would be located in a different location and user1 10 would be visually connected to user2 12 through a monitor at user2's location.

Figure 6A:
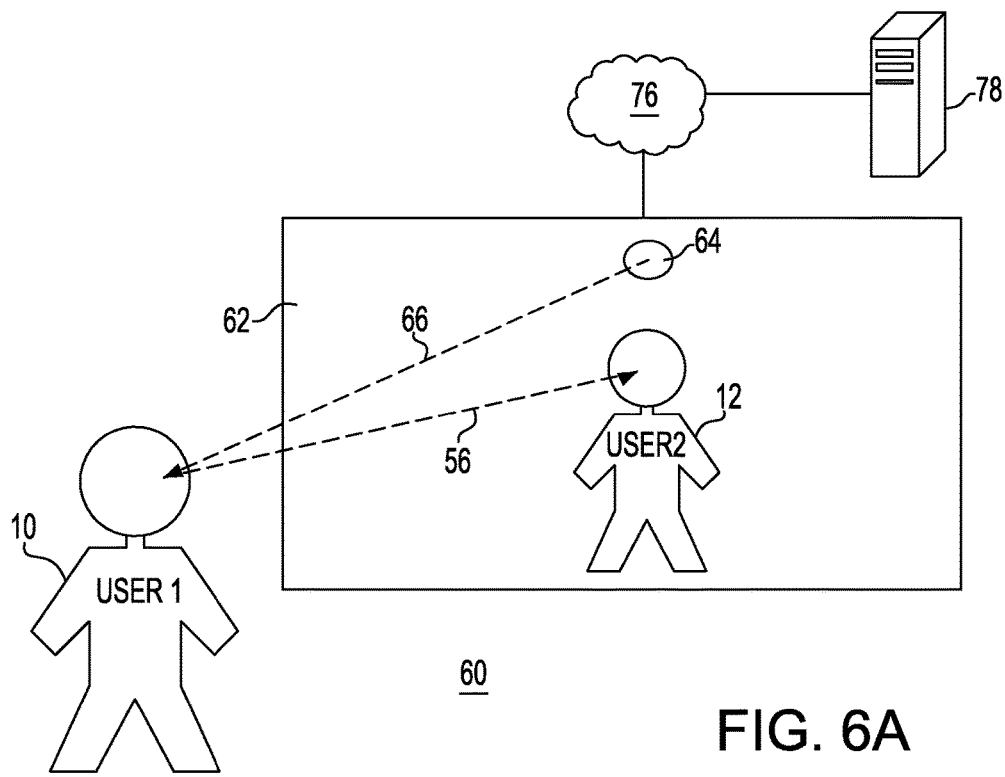
FIGS. 6A and 6B illustrate a process for determining eye contact between two users who are remotely located from each other but visually connected through a monitor.
Figure 6B:
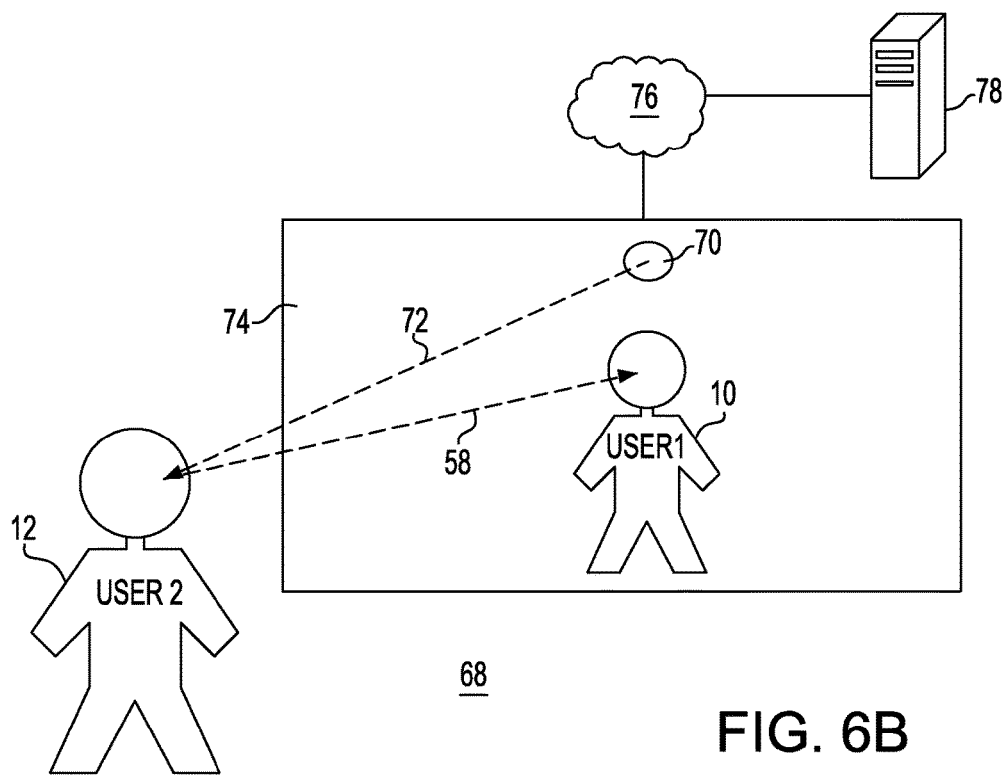

Referring now to FIGS. 6A and 6B, according to the exemplary embodiments, it may be determined whether the focus 56 of user1 10 matches the focus 58 of user2 12 to indicate that they have made eye contact. Referring first to FIG. 6A, user1 10 is focusing 56 on an image of user2 12 displayed on monitor 62. Monitor 62 has a camera 64 which observes 66 user1 10. Monitor 62 and camera 64 may be connected to a computing device 78. The connection to the computing device 78 may be wired or more likely, the connection may be through the internet 76. There may be a program in computing device 78 which through image recognition knows where the eyes of user2 12 are located on monitor 62 as viewed by user1 10. Camera 64 monitors user1's focus 56 and calculates by computing device 78 if user1 10 has made eye contact with the eyes of the image of user2 12 displayed on monitor 62.

Referring now to FIG. 6B, a similar procedure is followed to see if user2 12 has made eye contact with user1 10. That is, user2 12 is focusing 58 on an image of user1 10 displayed on monitor 74. Monitor 74 has a camera 70 which observes 72 user2 12. Monitor 74 and camera 70 may be connected to the computing device 78. The connection to the computing device 78 may be wired or more likely, the connection may be through the internet 76. There may be a program in computing device 78 which through image recognition knows where the eyes of user1 10 are located on monitor 74 as viewed by user2 12. Camera 70 monitors user2's focus 58 and calculates by computing device 78 if user2 12 has made eye contact with the eyes of the image of user1 10 displayed on monitor 74.

When computing device 78 indicates that mutual eye contact between user1 10 and user2 12 has been made, communication may be established between user1 10 and user2 12 by one of the means described previously. After the establishment of eye contact and communication between user1 10 and user2 12, file transfer between user 1 10 and user2 12 may commence as described previously.

The exemplary embodiments may also include a system for eye contact-based information transfer. The system may include a head mounted device having a video display and a computer device. The computer device may have a computer readable storage medium, the computer readable storage medium having program code embodied therewith, the computer readable program code may performs the method as described above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method for eye contact-based information transfer comprising:

establishing communication by a computer device between a first head mounted device worn by a first user and a second head mounted device worn by a second user;

establishing through gaze tracking of the first head mounted device and the second head mounted device that the first head mounted device has made eye contact with the second head mounted device and the second head mounted device has made eye contact with the first head mounted device; wherein establishing through gaze tracking comprises:

focusing by the first head mounted device on the second head mounted device displayed on a first video display having a first camera facing the first head mounted device;

determining by a first computer device connected to the first video display the location of the second head mounted device on the first video display;

determining by the first computer device connected to the first camera the focus of the first head mounted device with respect to the location of the second head mounted device on the first video display;

determining by the first computer device when the focus of the first head mounted device matches the location of the second head mounted device on the first video display;

focusing by the second head mounted device on the first head mounted device displayed on a second video display having a second camera facing the second head mounted device;

determining by a second computer device connected to the second video display the location of the first head mounted device on the second video display;

determining by the second computer device connected to the second camera the focus of the second head mounted device with respect to the location of the first head mounted device on the second video display;

determining by the second computer device when the focus of the second head mounted device matches the location of the first head mounted device on the second video display; and communicating between the first computer device and the second computer device to indicate that the first head mounted device and the second head mounted device have made eye contact when the focus of the first head mounted device matches the location of the second head mounted device on the first video display and the focus of the second head mounted device matches the location of the first head mounted device on the second video display; and responsive to an input to at least one of the first head mounted device and the second head mounted device made while the first head mounted device and the second head mounted device have established mutual eye contact, transferring by a computer device a file between the first head mounted device and the second head mounted device.

2. The method of claim 1 wherein the first head mounted device and the second head mounted device are in different locations and only visually connected through the first and second video displays such that establishing through gaze tracking is only through the first and second video displays.

3. A computer program product for eye contact-based information transfer, the computer program product comprising:
a computer readable storage medium having stored thereon:
first program instructions executable by a first computer device in a first head mounted device and a second computer device in a second head mounted device to cause the first and second computer devices to establish communication between the first head mounted device worn by a first user and the second head mounted device worn by a second user;
second program instructions executable by the first and second computer devices to establish through gaze tracking of the first head mounted device and the second head mounted device that the first head mounted device has made eye contact with the second head mounted device and the second head mounted device has made eye contact with the first head mounted device wherein the second program instructions executable by the first and second computer devices to establish through gaze tracking of the first head mounted device and the second head mounted device comprises:
third program instructions executable by the first computer device to focus by the first head mounted device on the second head mounted device displayed on a first video display having a first camera facing the first head mounted device;
fourth program instructions executable by a third computer device connected to the first video display to determine the location of the second head mounted device on the first video display;
fifth program instructions executable by the third computer device connected to the first camera to determine the focus of the first head mounted device with respect to the location of the second head mounted device on the first video display;
sixth program instructions executable by the first computer device to determine when the focus of the first head mounted device matches the location of the second head mounted device on the first video display;
seventh program instructions executable by the second computer device to focus by the second head mounted device on the first head mounted device displayed on a second video display having a second camera facing the second head mounted device;
eighth program instructions executable by a fourth computer device connected to the second video display to determine the location of the first head mounted device on the second video display;
ninth program instructions executable by the fourth computer device connected to the second camera to determine the focus of the second head mounted device with respect to the location of the first head mounted device on the second video display;
tenth program instructions executable by the second computer device to determine when the focus of the second head mounted device matches the location of the first head mounted device on the second video display; and
eleventh program instructions executable by the first computer device and the second computer device to communicate between the first computer device and the second computer device to indicate that the first head mounted device and the second head mounted device have made eye contact when the focus of the first head mounted device matches the location of the second head mounted device on the first video display and the focus of the second head mounted device matches the location of the first head mounted device on the second video display; and
responsive to an input to at least one of the first head mounted device and the second head mounted device made while the first head mounted device and the second head mounted device have established mutual eye contact, twelfth program instructions executable by the first and second computer devices to transfer a file between the first head mounted device and the second head mounted device.

4. The computer program product of claim 3 wherein the twelfth program instructions executable by the first and second computer devices to transfer the file execute only while eye contact between the first head mounted device and the second head mounted device is maintained.

5. The computer program product of claim 3 wherein the twelfth program instructions executable by the first and second computer devices to transfer the file execute only after eye contact between the first head mounted device and the second head mounted device is established and avoiding maintaining eye contact after transferring the file is initiated.

6. The computer program product of claim 3 further comprising thirteenth program instructions executable by the first and second computer devices to preconfigure the first head mounted device and the second head mounted device so that the first head mounted device automatically recognizes the second head mounted device to establish communication between the first head mounted device and the second head mounted device and the second head mounted device automatically recognizes the first head mounted device to establish communication between the first head mounted device and the second head mounted device.

7. The computer program product of claim 3 wherein second program instructions executable by the first and second computer devices to establish through gaze tracking of the first head mounted device and the second head mounted device comprises the first head mounted device focusing on the eyes of the second user of the second head mounted device and the second head mounted device focusing on the eyes of the first user of the first head mounted device.

8. The computer program product of claim 3 wherein the first head mounted device and the second head mounted device are in different locations and only visually connected through the first and second video displays such that establishing through gaze tracking is only through the first and second video displays.

* * * * *